Aug. 10, 1965   G. L. GRANSTEN   3,199,411
AIR MOTOR MEANS
Filed Dec. 10, 1962   3 Sheets-Sheet 1

INVENTOR.
Gunnar Lennart Gransten
BY
Stevens, Davis, Miller & Mosher
ATTORNEYS

INVENTOR.
Gunnar Lennart Gransten
BY
Stevens, Davis, Miller & Mosher
ATTORNEYS

Aug. 10, 1965    G. L. GRANSTEN    3,199,411
AIR MOTOR MEANS
Filed Dec. 10, 1962    3 Sheets-Sheet 3

INVENTOR
GUNNAR LENNART GRANSTEN
BY Stevens, Davis, Miller & Mosher
ATTORNEYS

United States Patent Office 3,199,411
Patented Aug. 10, 1965

3,199,411
AIR MOTOR MEANS
Gunnar Lennart Gransten, Lannersta, Sweden, assignor to Rederi AB Soya, Hagersten, Sweden, a joint-stock company limited of Sweden
Filed Dec. 10, 1962, Ser. No. 243,455
Claims priority, application Sweden, July 6, 1962, 7,594/62
1 Claim. (Cl. 91—204)

The present invention relates to a process for braking or reducing the number of revolutions of rotating air motors provided with an inlet and an outlet for the driving air.

It is desirable in air-driven motors to be able to reduce the number of revolutions and stop the motor quickly. This is, for example, particularly so in air-driven motors for dental purposes.

Both from the point of view of practical use and the point of view of safety, the dentist ought thus to be able to obtain a speedy reduction of the number of revolutions and a quick stop respectively on disconnecting the air-feed. Even with other applications, such as in industrial use, it is important to be able to stop quickly, e.g. in order to be able to change tools such as drills etc. without unnecessary delay.

The use has earlier been suggested for this purpose of mechanical brakes which are connected at the same time that the pressure is disconnected. Such mechanical braking means, however, are in many cases easily damaged and demand supervision, ground particles moreover being able to penetrate and cause damage to bearings and other easily damaged parts. A further inconvenience is that a mechanical brake must of necessity take up a lot of room with consequently a relatively great weight loading the construction in an unsuitable manner.

With turbines it is hardly possible to use anything other than a mechanical brake, but piston or lamina type air motors or equivalent constructions can, however, be provided with stop means which do not possess the inconveniences described above.

In accordance with this, the purpose of the present invention is to provide a process and an arrangement for executing a speedy reduction in the number of revolutions as well as a quick stop in air-driven motors of various kinds and especially for driving dentists' instruments and the like.

In accordance with this, the invention is characterized principally in that the outlet side is throttled in such a way that the motor is forced to work as a compressor.

The arrangement for carrying out the said process is characterized principally in that the outlet side of the motor is provided with a variable throttle which can be actuated by the inlet pressure or a regulated inlet pressure.

According to an alternative form of the invention, the outlet side of the air-motor can be provided with a variable throttle which can be actuated by the outlet pressure or a regulated outlet pressure.

In accordance with the invention, the motor will then function as a compressor with closed outlet during slowing down and braking.

In order to obtain effective braking it is suitable, in connection with disconnecting the pressure, for air evacuation of the inlet line to take place and for the inlet line to have connection with the pressure of the atmosphere so that the motor working as a compressor receives filling unhindered from the atmosphere pressure.

The invention will be further explained below with reference to a number of embodiments illustrated in the enclosed drawings and in connection with this further characterizing features of the invention will be set forth.

Figure 4:
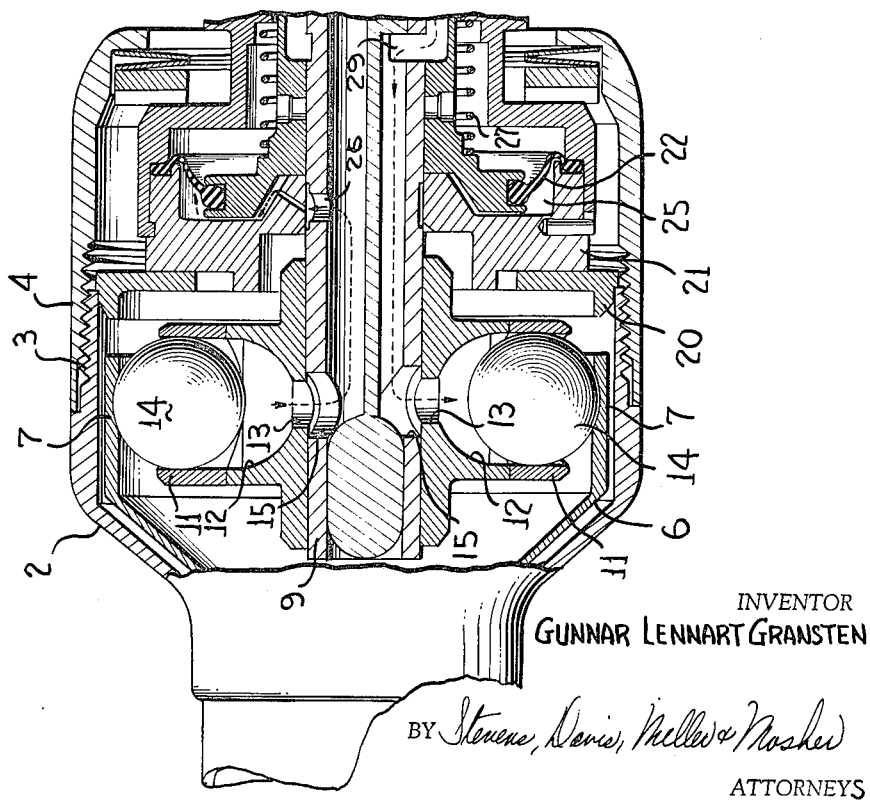

FIG. 4 is a detailed sectional view on an enlarged scale, showing in detail the relative position of the openings 13 and 15 with respect to the cylinders 12.

Figure 1:
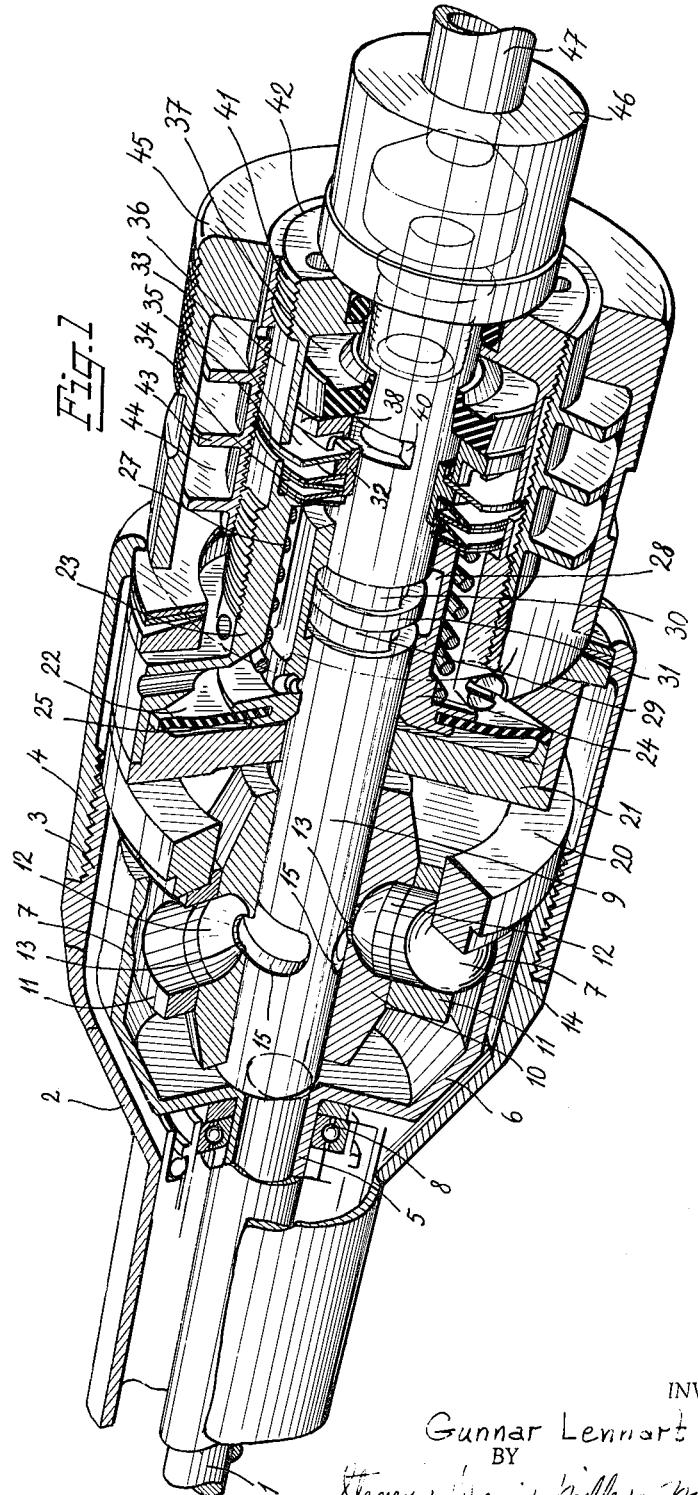
FIGURE 1 represents in perspective a broken view of a known air-driven motor chosen as an example, with pistons in the form of balls working in radial piston cylinder under eccenter actuation.
Figure 2:
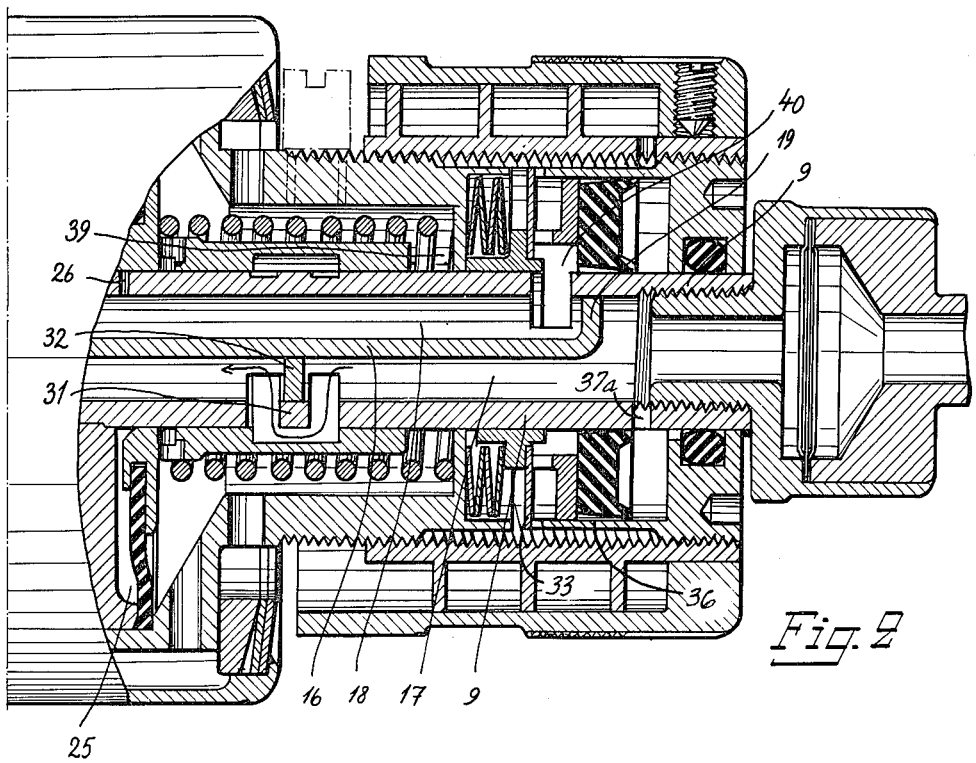
FIGURE 2 is mainly a longitudinal section of the end of the air motor which incorporated the means for braking or reducing the number of revolutions of the air motor, characteristic for the invention.

With reference in the first instance to FIGURES 1 and 2, the reference numeral 1 is used to designate an output shaft intended for securing to the outer ends of suitable drill chucks or other tools, not shown. On this shaft, inside a sleeve-shaped mantle substantially composed of a front mantle portion 2 and a rear mantle portion 4 screwed into it by means of threads 3, there is a cup-shaped member 6 secured by a throat 5, the inner periphery of the cup-shaped member 6 being provided with recesses 7. The throat 5 and the shaft 1 are mounted in a normal radial ball-bearing 8 which, according to purpose, is stationarily secured in the motor body. It is further evident from FIGURES 1 and 2 that a central, pipe-shaped and immovable shaft 9 extends through the air motor in its longitudinal direction, wherewith it may be pointed out that the output shaft 1 and the said central shaft 9 are eccentrically placed in relation to each other.

On this central shaft 9 there is a sleeve-shaped cylinder block 10 rotatably mounted on the shaft and provided with a desired number of radial connectors 11 defining piston cylinders 12 which are completely open at their radially outermost ends and spherical at their inner ends, these piston cylinders being also provided with openings 13 directed towards the centre of the shaft 9. Ball-shaped pistons 14 are sealed in the cylinders 12, of which pistons only one is shown in its position for the sake of illustration.

Furthermore, the central shaft 9 is broken by through-holes 15, intended to co-operate with the hole 13 in the cylinders 12 for a purpose that will later be evident.

An air motor of this kind is already known per se but to understand the invention in its entirety reference may also be made to FIGURE 2 from which it is clear that the central shaft 9, is longitudinally traversed by a diametrical separating wall 16, dividing the shaft into a compressed air inlet passage 17 and an air outlet passage 18. As can be seen from FIGURE 2 the separating wall presents at the rear end of the shaft 9 an upwardly bent portion 19 which completes the separation of both the passages. The openings 15 shown in FIGURE 1 serve as communication leads between the respective passages, i.e. the inlet passage 17 and outlet passage 18 in the central shaft 9, via the cylinders 12.

When the motor is to be started, compressed air is supplied from an outer source through the inlet passage 17, the air passing, via the lower hole 15 through the hole 13 into the lower cylinder 12 in FIGURE 1. The ball 14 is then pressed into the recess 7, torque arising through the mutually eccentric mounting of the cup-shaped member 6 and the cylinder block 10, which torque actuates the sleeve member 10 as well as the cup member 6 together with the shaft 1 into rotation, the balls 14, owing to the eccentric mounting, performing a reciprocatory movement during the rotation movement. When the cylinder 12 has thus rotated from the lower position shown to the upper position, the opening 13 comes into communication with the outlet passage 18 in the central shaft via the upper opening 15, the ball 14 having moved to its radial outer position. The process is repeated thereafter cyclically, the ball being pressed towards the centre in order, after communication with the inlet passage 17, to move outwards again.

Inside the rear part 4 of the mantle or cover, a support ring designated by the reference numeral 20 is inserted, against which support ring rests a further support ring 21. The latter support ring 21 forms a foundation for a membrane 22 of annular kind tightly anchored at its outer periphery against the support ring 21 by means of a further, step-shaped, sleeve member 23. The inner periphery of the said membrane 22 is, however, tightly anchored in a bushing-like member 24 which is slidably arranged on the central shaft 9. Between the member 21 and the membrane 22 an air column 25 is provided which, via a bleed hole 26 running through the central shaft 9 (see FIGURE 2), is continuously in communication with the outlet passage 18 in the central shaft. The sleeve member 24 is normally kept yieldingly pressed towards the support ring 21 by an axial pressure-spring 27, a suitable calibration of the spring being assumed in order that the outlet pressure in the column 25 may be balanced by the pressure from the spring 27 in a position intended to effect stabilization of the number of revolutions of the motor so that in every case no over-rotation can occur.

In this context it may be pointed out that the sleeve-shaped member 24 presents an annular interior groove 28 in its inner periphery, which groove is intended together with two grooves 29 and 30, breaking through the wall of the central shaft 9 towards the inlet passage 17, and a remaining part 31 of the central shaft 9, to form an automatically operating stabilizing valve, the inlet passage 17 in this area being closed by means of a substantially semi-circular separating wall 32 which forces the inlet air in the passage 17 to pass past this separating wall round the part 31 in the direction indicated by the arrow in FIGURE 2.

If, consequently, the outlet pressure rises in the outlet passage 18, this pressure will be transmitted through bleed hole 26 to act against the membrane 22 and press the sleeve member 24 towards the rear end of the motor. Therewith the groove 28 in the sleeve-shaped member 24 is also moved in such a manner that the flow path around the separating wall 32 in the inlet passage is throttled by movement of sleeve member 24 toward portion 31 of shaft 9 to restrict or constrict grooves 29 and 30. Depending on the calibration of the spring, a suitable supply of air for the air motor will automatically be stabilized.

On the central shaft 9 there is also slidably mounted a sleeve 32a which forms a foundation for an annular valve disc 33, suitably of springy constructions. This disc is kept yieldingly pressed towards the rear end of the motor by an axially operating pressure-spring 34. The valve disc 33 co-operates at its periphery with the end edge 35 of a co-axially arranged piston cylinder 36 in which a ring piston 37 is slidably mounted both in relationship to the central shaft 9 and to the inner wall of the piston cylinder 36. The piston 37 is provided with a support ring part 38, which can be an integral part of the piston itself, which is guided inside piston cylinder 36 and rests against the valve disc 33. The ring piston 37 is pressed by the inlet pressure in the inlet line 17 towards the front end of the motor through said pore 37a (see FIGS. 1 and 2) while lying against the valve disc 33 and under compression from the spring 34. A stop 39 is therewith arranged for the movement of the sleeve 32a, the stop consisting of a flange which projects downwards from the member 23. It can be further mentioned that the space between the valve disc 33 and the ring piston 37 communicates with the outlet passage 18 in the central shaft through a hole 40 in the shaft.

The details just described constitute together the arrangement itself according to the invention, wherewith it may be mentioned that when full inlet pressure is on ring piston 37, the ring piston keeps the valve disc 33 together with the sleeve 32a whereupon the sleeve is firmly pressed against the stop position 39. Therewith a flow-through column is provided between the end edge 35 of the piston cylinder 36 and the valve disc 33, through which the outlet air can pass out. The air passes to the atmosphere between edge 35 and disc 33 in the space or passage provided between the unthreaded outer surface of cylinder 36 and the inner surface of meter sleeve 42 through the port 36a, (see FIGURE 1) in sleeve 42. If, as opposed to this, the inlet pressure is disconnected, the spring 34 will tend to press the periphery of the valve disc 33 tightly against said end edge 35 of the piston cylinder 36 so that communication with the outer air is thereby completely cut off.

The air motor now has no outlet to the atmosphere, the consequence of which is that the motor will instead work as a compressor against an ever increasing counter-pressure in the outlet line. When complete sealing is attained between the disc 33 and the end edge 35 of the cylinder 36, the motor stops very quickly, constituting the solution to one of the problems that it is the purpose of the invention to solve. Furthermore, it can be stated that the degree of opening becomes dependent on the axial adjustment position of the disc 38 relative to the end edge 35 so that a variation can thereby be obtained of the rotation speed of the air motor depending on the size of the column opening between the disc 35 and the cylinder 36, whereby the arrangement also serves as a regulator of the number of revolutions through the actuation of the working pressure for the membrane 22.

The relation between the disc 33 and the end 35 of the cylinder is critical per se and for this reason the piston cylinder 36 is provided with threads 41, by means of which the piston cylinder can be adjusted to a suitable connection with the disc. Fixing of the adjusted position can thereafter take place by every method suitable for the purpose. The piston cylinder 36 is screwed into an outer sleeve designated by the reference numeral 42 which is screwed onto the stepped sleeve 23. This outer sleeve 42 is provided with a spiral shaped flange 43 which forms a spiral shaped silencing outlet path 44 for the air which passes past the disc 33. The outlet path is limited finally by an outer hood or mantle 45 which encloses it. The members 36, 42 and 45 ought to be fixable to each other after the piston cylinder 36 is adjusted in position. The relationship must therewith fulfill the condition that on turning the sleeve and the members 36 and 42 fixed thereto, through a pre-determined angle one attains the possibility of regulation between the minimum and maximum number of revolutions of the motor, i.e. the correct opening areas between the valve disc 33 and the cylinder end 35.

Finally, it may be mentioned that the compressed air source (not shown) is connected to the rear part of the air motor via a preformed connecting piece 46 presenting an inlet pipe 47.

Figure 3:
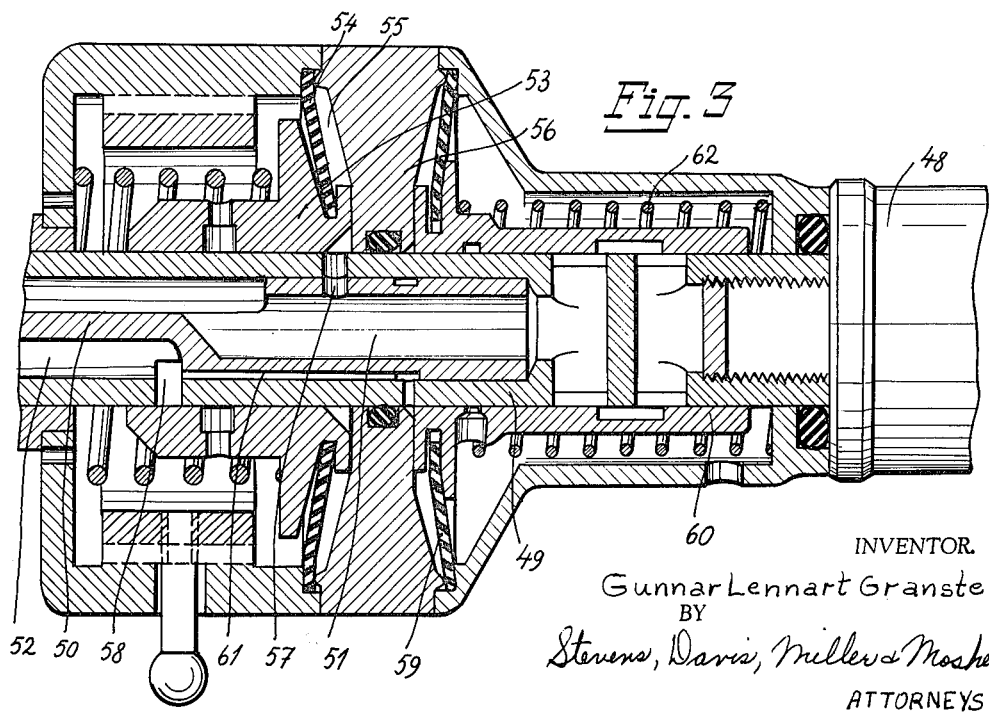
FIGURE 3 shows in longitudinal section an alternative embodiment of the arrangement illustrated in FIGURE 2.

A modified embodiment is shown in FIGURE 3 as an alternative to the embodiment of the invention described in connection with FIGURES 1 and 2.

In this figure an air inlet to a central shaft 49, corresponding to the previously described shaft 9, is designated by the reference numeral 48. The central shaft 49 is longitudinally divided by a separating wall 50 into an inlet passage 51 and an outlet passage 52. A sleeve 53 is slidably mounted on the shaft 49, which sleeve 53 carries a membrane 54. A column between a stationary wall portion 56 and the membrane communicates with the inlet line 51 via a hole 57.

The wall of the outlet line is broken by a hole 58 which, in the position shown corresponding to brake position, is sealed by the sleeve 53, which means that the outlet side of the motor is closed against the pressure of the atmosphere and that the motor now works as a compressor.

In FIGURE 3 a further membrane 59 is securely connected with a slide 60 which is slidable on the shaft 49 under the actuation of the outlet pressure through the passage 61 and the power of the pressure-spring 62. This arrangement corresponds completely to the membrane 22 in FIGURES 1 and 2. The placing of the regulator in front of the brake, as in FIGURE 3, implies that a regulated inlet pressure is used for braking.

The invention is not limited to the embodiments shown and described but can be varied in many ways within the scope of the basic idea of the invention.

Having now described the invention, what I claim as new and desire to secure by Letters Patent, is:

An air motor comprising a central fixed shaft with an air inlet passage and an air outlet passage, an eccentrically disposed rotatable motor housing with cylinders therein on said shaft, radially movable pistons disposed in said housing, said inlet and outlet passages being in communication with said cylinders for supplying air to rotate said motor, and throttle means in communication with said outlet passage for quickly stopping rotation of said motor comprising a ring piston, slidably disposed on said central shaft, a ring cylinder in which said ring piston is slidably disposed, said ring cylinder having an open end edge, a sealing sleeve member slidably disposed on said central shaft, biasing means normally urging said sleeve member toward said end edge to shut off flow of exhaust air from the motor, said sealing sleeve member being held out of engagement with said end edge during supply of air under pressure to said inlet passage, and variable air flow valve means on said air inlet passage including an internally grooved sleeve and spring means normally urging said valve toward an open position against the flow of outlet air under pressure through said outlet passage, whereby stoppage of air to said motor traps residual air therein and causes said rotatable motor housing to stop rotation.

References Cited by the Examiner
UNITED STATES PATENTS

| | | |
|---|---|---|
| 2,825,353 | 3/58 | Voytech. |
| 2,964,151 | 12/60 | Eckman. |
| 3,020,893 | 2/62 | Hamblin et al. |
| 3,033,236 | 5/62 | Rayman et al. |
| 3,049,098 | 8/62 | Katashi Inoue. |

FRED E. ENGELTHALER, *Primary Examiner.*